US010470259B2

(12) United States Patent
Doebbeler et al.

(10) Patent No.: US 10,470,259 B2
(45) Date of Patent: Nov. 5, 2019

(54) POWER SUPPLY FOR A NON-LINEAR LOAD WITH MULTILEVEL MATRIX CONVERTERS

(71) Applicant: SIEMENS AKTIENGESELLSCHAFT, Munich (DE)

(72) Inventors: Arno Doebbeler, Herzogenaurach (DE); Wolfgang Hoerger, Hausen (DE); Hans-Joachim Knaak, Erlangen (DE); Martin Pieschel, Nuremberg (DE); Jonas Pinkwart, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 432 days.

(21) Appl. No.: 15/312,711

(22) PCT Filed: Apr. 22, 2015

(86) PCT No.: PCT/EP2015/058628
§ 371 (c)(1),
(2) Date: Nov. 21, 2016

(87) PCT Pub. No.: WO2015/176899
PCT Pub. Date: Nov. 26, 2015

(65) Prior Publication Data

US 2017/0208654 A1 Jul. 20, 2017

(30) Foreign Application Priority Data

May 19, 2014 (EP) .................................... 14168824

(51) Int. Cl.
*H05B 7/148* (2006.01)
*H05B 7/144* (2006.01)
(Continued)

(52) U.S. Cl.
CPC ............. *H05B 7/148* (2013.01); *F27B 3/085* (2013.01); *H02M 1/12* (2013.01); *H02M 5/293* (2013.01);
(Continued)

(58) Field of Classification Search
CPC ......... H02P 27/16; H02M 1/12; H02M 5/297; H02M 5/293; H02M 2007/4835;
(Continued)

(56) References Cited

U.S. PATENT DOCUMENTS 6,014,323 A 1/2000 Aiello et al.
6,075,350 A * 6/2000 Peng .................... H02J 3/1814 323/207
(Continued)

FOREIGN PATENT DOCUMENTS

CN 101313189 A 11/2008
CN 102983735 A 3/2013
(Continued)

OTHER PUBLICATIONS

Klug, Bernhard: „Untersuchung der Steuerung fuer Matrixumrichter und Entwicklung eines neuen Verfahrens zur Reduzierung der Gleichkomponente mit der Raumvektormodulation [Examination of control for matrix converters and development of a new method for reducing the DC component for space vector modulation], Thesis submitted at the Faculty of Mechanical Engineering, Electrical Engineering and Business Engineering at Brandenburg's Cottbus Technical University.

*Primary Examiner* — Hung D Nguyen
(74) *Attorney, Agent, or Firm* — Laurence Greenberg; Werner Stemer; Ralph Locher

(57) ABSTRACT

A non-linear load in the form of an arc furnace with an upstream furnace transformer is supplied with electric power from a power supply device with a plurality of converter
(Continued)

3 U 31 1 I5 9 32 27 18 I2* C* 26 I4 I1* UL 28 IL 30 29 2 25 S units. The converter units have a plurality of main modules with inputs connected to a respective phase of a three-phase grid. The converter units have a common star point between the main modules and the primary side of the furnace transformer. Each main module has a series circuit with a coupling inductance and a plurality of submodules. The submodules have a bridge circuit with four self-commutated semiconductor switches and a bridge path with a storage capacitor between input and output. The semiconductor switches of the submodules can each be switched independently of the semiconductor switches of the other submodules of the same main module and of the other main modules.

12 Claims, 6 Drawing Sheets

(51) Int. Cl.

| | |
|---|---|
| ***H02P 27/16*** | (2006.01) |
| ***H02M 1/12*** | (2006.01) |
| ***H02M 5/297*** | (2006.01) |
| ***F27B 3/08*** | (2006.01) |
| ***H02M 5/293*** | (2006.01) |
| *H02M 7/483* | (2007.01) |
| *F27D 99/00* | (2010.01) |
| *H02J 3/01* | (2006.01) |

(52) U.S. Cl.
CPC ............ *H02M 5/297* (2013.01); *H02P 27/16* (2013.01); *H05B 7/144* (2013.01); *F27D 2099/0021* (2013.01); *H02J 3/01* (2013.01); *H02M 2005/2932* (2013.01); *H02M 2007/4835* (2013.01); *Y02P 10/256* (2015.11); *Y02P 10/259* (2015.11)

(58) Field of Classification Search
CPC ........... H02M 2005/2932; H05B 7/005; H05B 7/144; H05B 7/148; F27B 3/085; F27B 3/28; Y02P 10/256; Y02P 10/259; F27D 2099/0021; H02J 3/01
USPC ......................... 373/102, 104, 105, 106, 108
See application file for complete search history.

(56) References Cited

U.S. PATENT DOCUMENTS

| | | | | |
|---|---|---|---|---|
| 7,582,851 | B2 | 9/2009 | Fishman et al. | |
| 2005/0083716 | A1 | 4/2005 | Marquardt | |
| 2006/0289494 | A1* | 12/2006 | Fishman .................. | H05B 6/40 219/663 |
| 2007/0247079 | A1 | 10/2007 | Sager et al. | |
| 2009/0219968 | A1 | 9/2009 | Perry et al. | |
| 2011/0176575 | A1 | 7/2011 | Hoerger et al. | |

FOREIGN PATENT DOCUMENTS

| | | | |
|---|---|---|---|
| DE | 102008049610 | A1 | 4/2010 |
| EP | 1729542 | A2 | 12/2006 |
| EP | 1848248 | A1 | 10/2007 |
| FR | 2926182 | A1 | 7/2009 |
| JP | 2004096897 | A | 3/2004 |
| WO | 2009139078 | A1 | 11/2009 |

* cited by examiner

L1
L2
L3
21
3
48
Z
C*
C*
C*
18
6
6
4
9
24
23
22
Y1
Y2
Y3
2
1

6
6
6
5
5
5
4
8
8
7
8
19, L
20, C
9

6
33
I5
11
11
5
11
11
10
I5
8

14
15
15'
15
15'
16
12
13
Uzk
11
17
15
15'
15
15'

28
S
IL
UL
29
30
25
2
26
27
32
I4
9
C*
I1*
1
3
I5
U
31
18
I2*

POWER SUPPLY FOR A NON-LINEAR LOAD WITH MULTILEVEL MATRIX CONVERTERS

BACKGROUND OF THE INVENTION

Field of the Invention

The present invention relates to a nonlinear load supplied with electric power by means of a power supply device.

Nonlinear loads and their associated power supply devices are known generally. Purely by way of example, reference is made to DE 10 2008 049 610 A1 and US 2011/0 176 575 A1, which corresponds thereto.

The thesis "Untersuchung der Steuerung für Matrixumrichter und Entwicklung eines neuen Verfahrens zur Reduzierung der Gleichkomponente bei der Raumvektormodulation" [Examination of control for matrix converters and development of a new method for reducing the DC component for space vector modulation] by Bernhard Klug, submitted at the Faculty of Mechanical Engineering, Electrical Engineering and Business Engineering at Brandenburg's Cottbus Technical University, discloses various matrix converters and control methods for these matrix converters. As part of the thesis, the converters are used to actuate an electric machine.

Nonlinear loads often require filters and other compensators, such as an SVC (static VAR compensator) or STATCOM (static compensator), in order to reduce grid system disturbances or to keep them at a tolerable level.

The power supply device known from DE 10 2008 049 610 A1 involves the nonlinear load being supplied with power from the polyphase grid system via an intermediate circuit converter. The intermediate circuit converter has a number of converter elements that each consist of a multistage series circuit comprising submodules. The submodules each have a storage capacitor and at least two self-commutated semiconductor switches. The semiconductor switches of the individual submodules are switchable independently of the semiconductor switches of the other submodules, so that the storage capacitor of the respective submodule is bypassed or active by means of the semiconductor switches of the respective submodule, depending on the switching state of said semiconductor switches.

This power supply device particularly allows the frequency at which the nonlinear load is supplied with power to be chosen independently of the frequency of the polyphase grid system. Additionally, grid system disturbances can be limited to a considerable degree.

CN 102 983 735 A discloses a power supply device that has a plurality of converter units that, for their part, each have a plurality of main modules. The main modules each have an input connection that is connected to a respective phase of a polyphase grid system operated at an operating frequency. The converter units each have a common star point that is connected firstly to a respective output of the main modules of the respective converter unit and secondly via an output connection of the respective converter unit to the load. The main modules each have a series circuit comprising a coupling inductance and a plurality of submodules. The submodules each have a submodule input and a submodule output and, between the respective submodule input and the respective submodule output, a bridge circuit having four self-commutated semiconductor switches and a bridge path. A respective storage capacitor is arranged in the bridge path. The semiconductor switches of the submodules are each switchable independently of the semiconductor switches of the other submodules of the same main module and of the other main modules.

WO 2009/139 078 A1 discloses a voltage stabilization system. In the case of this system, the load is connected directly to the phases of a polyphase voltage system. In addition, there is a connection between the phases of the polyphase system and the load via a respective submodule. The submodules each have a submodule input and a submodule output and, between the respective submodule input and the respective submodule output, a bridge circuit having four self-commutated semiconductor switches and a bridge path. A respective storage capacitor is arranged in the bridge path.

BRIEF SUMMARY OF THE INVENTION

The object of the present invention is to provide a power supply for a nonlinear load in which the grid system disturbances can be almost completely eliminated, energy efficiency for the supply of power to the nonlinear load is increased and, particularly in the case of an arc furnace, the melting operation can be speeded up through quieter burning of the arcs.

The object is achieved by a nonlinear load having the features as claimed. Advantageous embodiments of the nonlinear load are the subject matter of dependent claims.

According to the invention, there is provision

- for the nonlinear load to be in the form of an arc furnace having an upstream furnace transformer,
- for the power supply device to have a plurality of converter units,
- for the converter units each to have a plurality of main modules,
- for the main modules each to have an input connection that is connected to a respective phase of a polyphase grid system operated at an operating frequency,
- for the converter units each to have a common star point that is connected firstly to a respective output of the main modules of the respective converter unit and secondly via an output connection of the respective converter unit to the primary side of the furnace transformer,—for the main modules each to have a series circuit comprising a coupling inductance and a plurality of submodules,
- for the submodules each to have a submodule input and a submodule output and, between the respective submodule input and the respective submodule output, a bridge circuit having four self-commutated semiconductor switches and a bridge path in which a respective storage capacitor is arranged, and
- for the semiconductor switches of the submodules each to be switchable independently of the semiconductor switches of the other submodules of the same main module and of the other main modules.

The particular effect achieved by these measures is that an operating frequency of the nonlinear load is different than the operating frequency of the polyphase grid system. In particular, the operating frequency of the nonlinear load may be higher than the operating frequency of the polyphase grid system. The exemplary effect achieved by this is that an interrupted arc very quickly reignites and burns quietly. Additionally, productivity can be increased, in particular. The embodiment of the main modules as multilevel sections means that grid system disturbances can additionally be eliminated almost completely. By way of example, the operating frequency of the nonlinear load may be between 70 Hz and 200 Hz. It may alternatively be constant during operation or can be varied during operation on the basis of the operating state of the nonlinear load. By way of example, the operating frequency can be set on the basis of the arc voltage and the arc current.

There are a minimum of two converter units. Preferably, the number of converter units is at least three, however. This applies particularly when the nonlinear load is a polyphase load. In particular, the number of converter units is in this case preferably equal to the number of phases of the nonlinear load. Additionally, each converter unit has a minimum of two main modules. Preferably, however, the number of main modules per converter unit is also at least three. In particular, the number of main modules per converter unit is preferably equal to the number of phases of the polyphase grid system. These embodiments allow the loading of the polyphase grid system to be evened out to a particularly large extent.

Usually—but not necessarily—the number of phases in polyphase grid systems is three. If there are only two converter units in such a case, then the nonlinear load is a single-phase load or a two-phase load. If, in this case, each converter unit has only two main modules, then one phase of the polyphase grid system is normally connected to a respective one of the two main modules of the two converter units. The two other phases of the polyphase grid system are usually connected to the respective other main module of the two converter units. If, by contrast, there are admittedly only two converter units in this case, but each converter unit has three main modules, then each phase of the polyphase grid system is connected, per converter unit, to a respective one of the main modules thereof. If there are three converter units, then the nonlinear load is a polyphase load. If each converter unit has only two main modules in this case, then each phase of the polyphase grid system is normally connected to two main modules, the two main modules to which the respective phase is connected each being arranged in different converter units. If there are both three converter units and each converter unit has three main modules, then each phase of the polyphase grid system is connected, per converter unit, to a respective one of the main modules thereof.

The output connections of the converter units and the primary side of the furnace transformer have—with the exception of switching devices that perform no kind of voltage conversion, filtering or make no kind of other alterations and also any series inductors arranged on the primary side of the furnace transformer—no kind of further elements arranged between them. The series inductors may, if present, be integrated in the furnace transformer or be arranged outside the furnace transformer.

The inventive embodiment the power supply device allows the voltage applied to the primary side of the furnace transformer to be set as required. It is therefore possible for the furnace transformer to have no step switch (on load tap changer). Nevertheless, a secondary-side voltage that is required for operation can be set, since this merely requires appropriate actuation of the converter units or of the semiconductor switches of the submodules to be effected.

Preferably, there is provision for voltages applied to the secondary side of the furnace transformer and currents flowing on the secondary side of the furnace transformer to be detected, for the voltages and currents detected on the secondary side of the furnace transformer to be taken as a basis for using electrode control to perform position control for electrodes of the arc furnace and for the electrode control to ascertain nominal current values and/or nominal voltage values for the converter units. This allows particularly robust and reliable control of the arcs of the arc furnace to be effected.

It is possible that the converter units have neither an inductor nor a capacitor between their respective star point and their respective output connection. Alternatively, it is possible for the converter units to have an inductor or a capacitor between their respective star point and their respective output connection. It is even possible for the converter units to have a series circuit comprising an inductor and a capacitor between their respective star point and their respective output connection. Which of these embodiments is used depends on the circumstances of the individual case. Since the nonlinear load is an arc furnace, there will normally be no inductor. There may be a capacitor.

In the case of an arc furnace, the following problems arise, for example: the design and mode of action of an arc furnace mean that the inductance present in the furnace circuit is relatively high. This inductance is obtained by converting the inductance on the secondary side of the furnace transformer to the primary side. In order to achieve the desired flow of current in the arc furnace, the voltage on the primary side of the furnace transformer needs to be correspondingly high. This has associated disadvantages. By way of example, the converter units need to be designed for a correspondingly high voltage. The capacitor can set the effective reactance to a desired value. Criteria for the design of the capacitor or generally of the indicator and/or the capacitor are the required converter voltage, short-circuit current limiting and robustness. The reactance X is obtained generally through the relationship $$X = \frac{(2\pi F)^2 (L + LS) \cdot C - 1}{2\pi FC}$$

In the formula above, X is the desired reactance, F is the frequency at which the nonlinear load is operated, L is the inductance of the inductor, LS in the inductance of the nonlinear load and C is the capacitance of the capacitor.

As a rule, the output connections of the converter units and the load have a first switching device arranged between them for operational connection and isolation of the load from the converter units. By way of example, the first switching device may he in the form of what is known as a frequent-operation circuit breaker, in the form of what is known as a frequent-operation isolator or in the form of a contactor. Switching devices of this kind allow relatively frequent switching until significant wear occurs, for example at least 100,000 switching operations.

Additionally, the output connections of the converter units and the load may have a second switching device arranged between them for unscheduled isolation of the load from the converter units. This second switching device is usually not operated. It is normally arranged downstream of the first switching device.

The second switching device has supplementary inputs that are connected to at least a portion of the phases of the polyphase grid system. As a result, the load, if isolated from the converter units in an unscheduled manner, is connectable to the said portion of the phases via the second switching device and the supplementary inputs thereof. As a result, emergency operation of the nonlinear load can he maintained, for example, when there is a malfunction in the converter units or the converter units or the like are being serviced.

The actuation of the semiconductor switches of the submodules is known as such. It can be effected according to various criteria. By way of example, it is possible for the semiconductor switches of the submodules to be actuated by a control device such that load currents applied to the output connections of the converter units are sinusoidal or nonsinusoidal.

Alternatively or additionally, it is possible for the semiconductor switches of the submodules to be actuated by a control device such that load currents applied to the output connections of the converter units have the same or different RMS values. As a result, it is possible to influence the temperature distribution in the arc furnace or in the crucible in a specific manner.

Additionally, it is possible for the semiconductor switches of the submodules to be actuated by a control device such that load currents supplied to the nonlinear load are distributed to the phases of the polyphase grid system as per specification. By way of example, the specification may consist in the grid system currents drawn from the polyphase grid system being sinusoidal and/or the grid system currents drawn from the polyphase grid system having a predetermined phase offset relative to phase voltages applied in the polyphase grid system. The specification can additionally be influenced by a state of the polyphase grid system. As a result, reactive power can be drawn from, or reactive power can be supplied to, the polyphase grid system in a specific manner as required, for example. It is also possible for harmonics of the polyphase grid system that are not attributable to operation of the nonlinear load to be reduced, for example.

The properties, features and advantages of this invention that are described above and also the manner in which they are achieved will become clearer and more distinctly comprehensible in connection with the description of the exemplary embodiments that follows, these being explained in more detail in conjunction with the drawings, in which, schematically:

DESCRIPTION OF THE INVENTION

Figure 1:
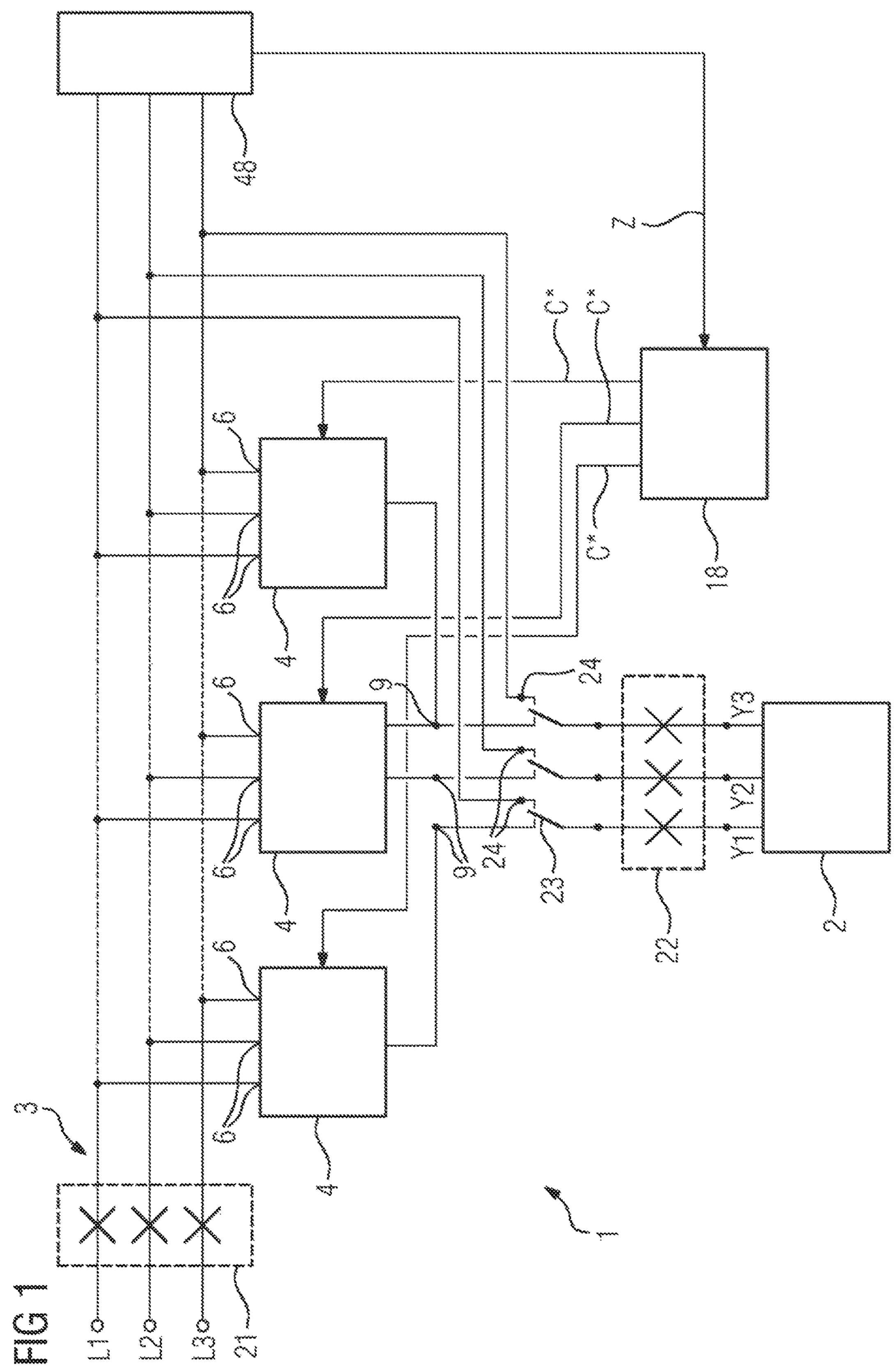
FIG. 1 shows a power supply device and a nonlinear load.

In accordance with FIG. 1, a power supply device 1 is intended to be used to supply a nonlinear load 2 with electric power from a polyphase grid system 3. The polyphase grid system 3 is operated at an operating frequency f. The operating frequency f is normally 50 Hz or 60 Hz.

To supply the nonlinear load 2 with electric power, the power supply device 1 has a plurality of converter units 4. The minimum number of converter units 4 is two. Normally, the number of converter units 4, in line with the representation in FIG. 1, is at least three and/or is equal to the number of phases of the nonlinear load 2.

Figure 2:
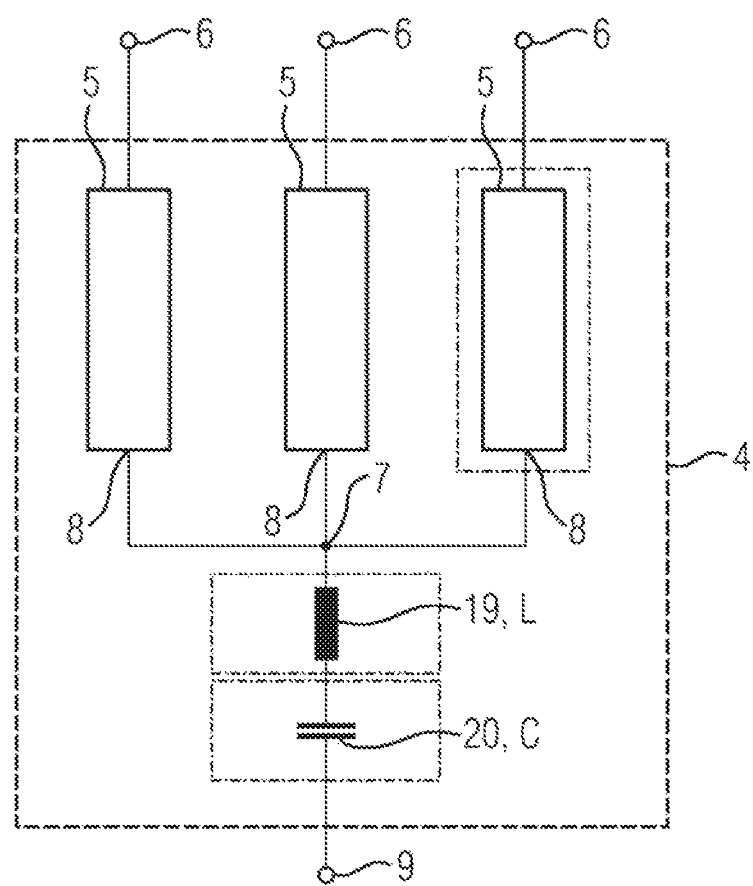
FIG. 2 shows a converter unit.

In accordance with FIG. 2, the converter units 4 each have a plurality of main modules 5. The minimum number of main modules 5 per converter unit 4 is two. Normally, the number of main modules 5, in line with the representation in FIG. 2, is at least three and/or is equal to the number of phases of the polyphase grid system 3.

The main modules 5 each have an input connection 6. The input connections 6 are each connected to a phase of the polyphase grid system 3. The input connections 6 of the main modules 5 of a particular converter unit 4 are, in accordance with FIG. 1, connected to different phases of the polyphase grid system 3, that is to say each to a different phase. The converter units 4 additionally each have a common star point 7. The star point 7 of the respective converter unit 4 is connected firstly to a respective output 8 of the main modules 5 of the respective converter unit 4. Secondly, the star point of the respective converter unit 4 is connected via an output connection 9 of the respective converter unit 4 to the nonlinear load 2.

Figure 3:
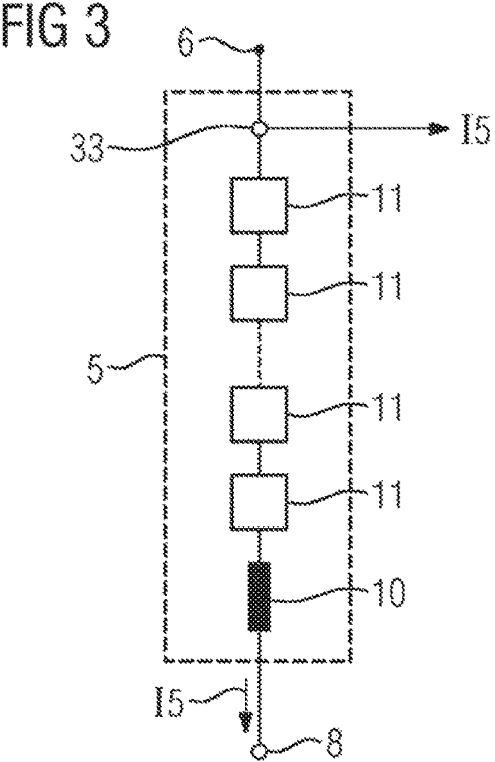
FIG. 3 shows a main module.

The main modules 5 each have, in accordance with FIG. 3, a series circuit comprising a coupling inductance 10 and a plurality of submodules 11. The number of submodules 11 may be determined as required. It depends on the voltage of the polyphase grid system 3. Normally, the number of submodules 11 is between 10 and 100, for example between 20 and 50.

Figure 4:
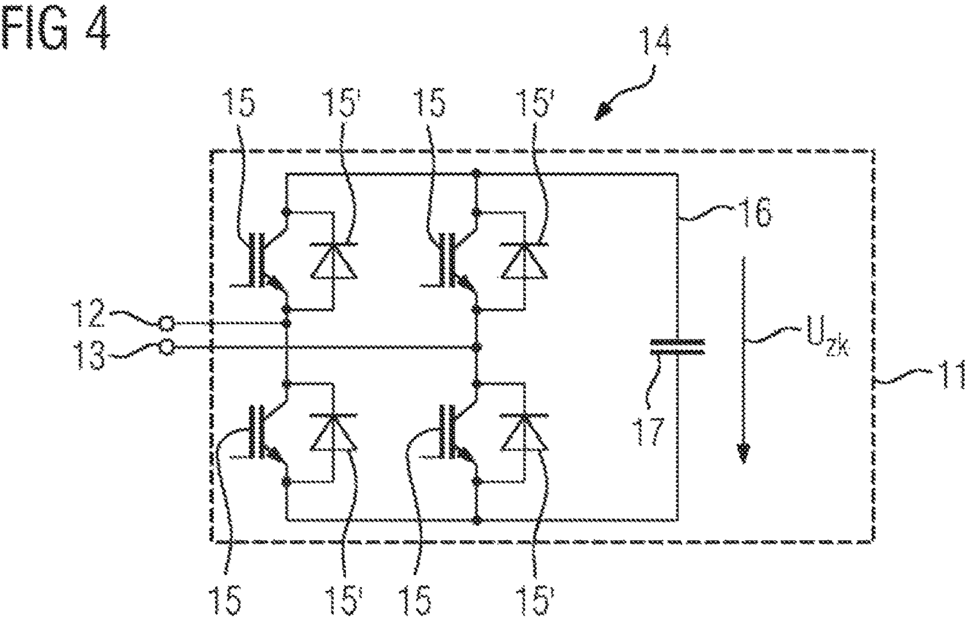
FIG. 4 shows a submodule.

The submodules 11 each have, in accordance with FIG. 4, a submodule input 12 and a submodule output 13. In terms of directly successive submodules 11, the submodule input 12 of one submodule 11 is directly connected to the submodule output 13 of the other submodule 11.

The submodules 11 additionally have a bridge circuit 14 between the respective submodule input 12 and the respective submodule output 13. The bridge circuit 14 has four self-commutated semiconductor switches 15 and a bridge path 16. A storage capacitor 17 is arranged in the bridge path 16. The semiconductor switches 15 each have—intrinsically or separately—a freewheeling diode 15' connected in parallel with them. Instead of the semiconductor switches 15 (including the parallel-connected freewheeling diodes 15'), it would also be possible for series or parallel circuits of semiconductor switches 15 (in each case including a parallel-connected freewheeling diode 15') to be used in each case.

The term "self-commutated" has a firm meaning for a person skilled in the art. It means that the semiconductor switches 15 are both connectable and disconnectable by actuating signals C* that are supplied to the semiconductor switches 15 from the outside.

Examples of such semiconductor switches are IGBTs, IEGTs, IGCTs or GTO thyristors. The term "self-commutated" is in contrast to the term "line-commutated". This term means that although the respective switching element can be connected in the specific manner by a control signal supplied from the outside, it cannot be disconnected by a control signal supplied from the outside. By way of example, disconnection is effected by means of inversion of the voltage dropped across the line-commutated semiconductor switch element. An example of a line-commutated semiconductor switch is a "normal" thyristor.

Normally—with the exception of technologically dependent switching pauses in which all four semiconductor switches 15 are disconnected—two semiconductor switches

15 are connected and disconnected in each case. It is possible for the two semiconductor switches 15 at the top of FIG. 4 to be connected and for the two semiconductor switches 15 at the bottom in FIG. 4 to be disconnected. Similarly, it is possible for the two semiconductor switches 15 at the bottom in FIG. 4 to be connected and for the two semiconductor switches 15 at the top in FIG. 4 to be disconnected. In these two cases, the submodule input 12 of the relevant submodule 11 is directly connected to the submodule output 13 of the relevant submodule 11. Alternatively, the semiconductor switches 15 may be connected or disconnected in crosswise fashion. Depending on whether the top left and bottom right semiconductor switches 15 in FIG. 4 are connected or whether the top right and bottom left semiconductor switches 15 in FIG. 4 are connected, a current I5 flowing at the respective submodule input 12 (see FIG. 3) flows in a positive or negative direction of flow via the respective storage capacitor 17.

The semiconductor switches 15 of the submodules 11 are controlled by a control device 18 in accordance with FIG. 1. For each semiconductor switch 15 of each submodule 11, the control device 18 ascertains a respective separate actuating signal C*. The semiconductor switches 15 of the submodules 11 are therefore each switchable independently of the semiconductor switches 15 of the other submodules 11 of the same main module 5 or of the other main modules 5 of the same converter unit 4 or of the main modules 5 of another converter unit 4.

In line with the representation in FIG. 2, it is possible for the converter units 4 to have an inductor 19 or a capacitor 20 between their respective star point 7 and their respective output connection 9. In contrast to the coupling inductance 10 that, in accordance with FIG. 3, is part of the respective main module 5, the inductor 19, where present, is active consistently for all main modules 5 of the respective converter unit 4. Alternatively, it is possible for neither the inductor 19 nor the capacitor 20 to be present. As a further alternative, it is possible for the converter units 4 to have a series circuit comprising the inductor 19 and the capacitor 20 between their respective star point 7 and their respective output connection 9.

The power supply device 1 normally has, in accordance with FIG. 1, a switching device 21 on the input side. The switching device 21 can be used to isolate the whole power supply device 1, including all downstream components (particularly the nonlinear load 2), from the polyphase grid system 3. The switching device 21 may be in a form as required.

Normally, the power supply device 1 additionally has a further switching device 22, subsequently called first switching device 22, between the output connections 9 of the converter units 4 and of the nonlinear load 2. If the first switching device 22 is present, it is used for operationally connecting and isolating the nonlinear load 2 from the converter units 4. The first switching device 22 may be particularly in the form of what is known as a frequent-operation circuit breaker, in the form of what is known as a frequent-operation isolator or in the form of a contactor.

In some cases, there is no further switching device between the output connections 9 and the nonlinear load 2 in addition to the first switching device 22. In some cases, however, there is such a further switching device 23, subsequently referred to as second switching device 23 in order to distinguish it from the first switching device 22. The second switching device 23 is not operated during normal operation of the power supply device 1. It thus remains constantly closed. The second switching device 23 is used for unscheduled isolation of the nonlinear load 2 from the converter units 4. If the second switching device 23 is present, it is normally arranged downstream of the first switching device 22.

If the second switching device 23 is present, it may—in this respect in similar fashion to the switching devices 21, 22—be in the form of a simple switch by means of which the nonlinear load 2 is either connected to or isolated from the converter units 4. Preferably, however, the second switching device 23 has supplementary inputs 24. The number of supplementary inputs 24 corresponds to the number of phases of the nonlinear load 2. The supplementary inputs 24 are each connected to a phase of the polyphase grid system 3. This allows the nonlinear load 2 to be connected to the relevant phases of the polyphase grid system 3 via the second switching device 23 and the supplementary inputs 24 thereof in the event of its being isolated from the converter units 4 in an unscheduled manner. This allows emergency operation of the nonlinear load 2 to be maintained—but in this case compulsorily at the operating frequency f of the polyphase grid system 3.

For each of the switching devices 21, 22, 23, it is possible for the relevant switching device 21, 22, 23 to be operated manually. Similarly, for each of the switching devices 21, 22, 23, it is possible for the relevant switching device 21, 22, 23 to be operated by the control device 18. Which switching device 21, 22, 23 is operated in which manner is at the discretion of a person skilled in the art.

Figure 5:
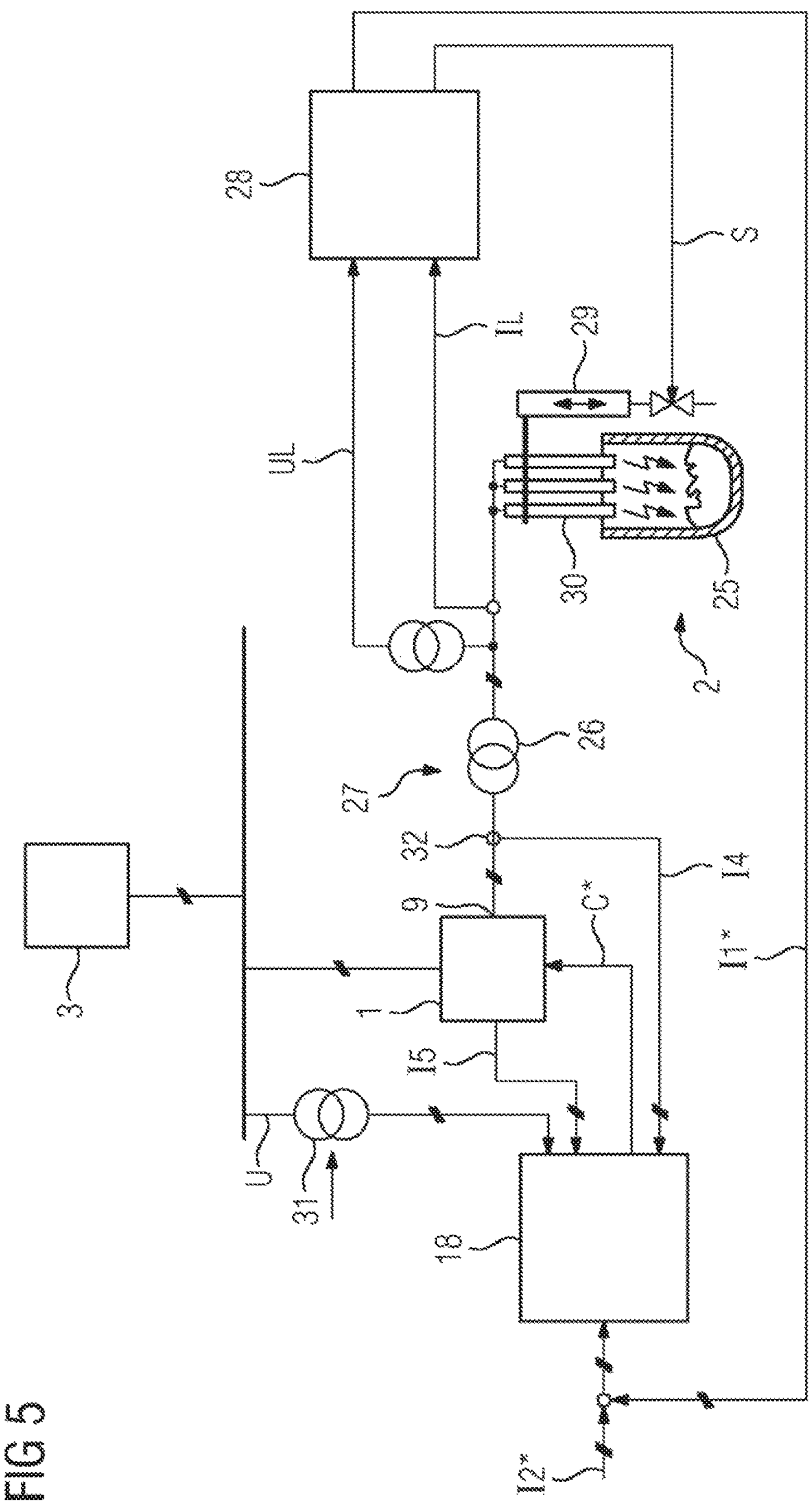
FIG. 5 shows a nonlinear load, in the form of an arc furnace, with its power supply device and further components.

In accordance with FIG. 5, the nonlinear load 2 is in the form of an arc furnace 25 having an upstream furnace transformer 26. The furnace transformer 26 is used to transform a medium voltage applied to the primary side of the furnace transformer 26 to a low voltage that is output on a secondary side of the furnace transformer 26. The medium voltage is normally 10 kV or 35 kV, in some cases also a value in between those or slightly below 10 kV or above 35 kV. In rare individual cases, the medium voltage may also be significantly higher than 35 kV. In quite rare individual cases, a high voltage can be used instead of the medium voltage. By way of example, the high voltage may be approximately 65 kV to approximately 70 kV or may even be approximately 110 kV to approximately 115 kV. The low voltage is normally between several 100 V and 2 kV. By way of example, it may be approximately 500 V to approximately 1500 V. The output connections 9 of the converter units 4 are, in accordance with FIG. 5, directly connected to the primary side 27 of the furnace transformer 26. Only the first switching device 22 and possibly also the second switching device 23 are present. Thus, no voltage conversion or the like takes place between the output connections 9 and the furnace transformer 26.

The converter units 4 can be used to set voltage and current values as required. It is therefore possible, merely through appropriate actuation of the converter units 4—to be more precise: the semiconductor swatches 15 of the submodules 11—, to set the primary-side voltage supplied to the furnace transformer 26 as required independently of voltage fluctuations in the polyphase grid system 3. It is therefore not necessary for the furnace transformer 26 to have step switches on the primary side and/or on the secondary side.

Otherwise, the furnace transformer 26 may be designed as required. It may be designed and dimensioned particularly for the desired operating frequency F of the arc furnace 25, that is to say a frequency particularly above the operating frequency f of the polyphase grid system 3.

In accordance with FIG. 5, voltages UL applied to the secondary side of the furnace transformer 26 and currents IL flowing therein are detected on said secondary side of the furnace transformer. The detected voltages UL and currents IL are supplied to an electrode control section 28. The electrode control section 28 takes the values UL, IL as a basis for ascertaining a manipulated variable S for an adjusting device 29. This corrects a position of electrodes 30 of the arc furnace 25. Thus, the voltages UL and currents IL detected on the secondary side of the furnace transformer 26 are taken as a basis for effecting position control for the electrodes 30. The adjusting device 29 may be in the form of a hydraulic cylinder unit, for example.

Additionally, the electrode control section 28 takes the voltages UL and currents IL detected on the secondary side of the furnace transformer 26 as a basis for ascertaining, for each phase of the arc furnace 25, nominal current values I1* for the converter units 4 and transmits them to the control device 18. As an alternative or in addition to the nominal current values I1*, the electrode control section 28 can take the voltages UL and currents IL detected on the secondary side of the furnace transformer 26 as a basis for ascertaining nominal voltage values for the converter units 4 and can transmit these to the control device 18.

FIG. 5 additionally shows some embodiments of the power supply device 1, which are explained in more detail below.

In accordance with FIG. 5, the supply voltage U of the polyphase grid system 3 is detected—for example using a measurement transformer 31—and supplied to the control device 18. Additionally, current sensors 32 are used to detect the currents 14 that are output by the converter units 4 and are supplied likewise to the control device 18. Finally, further current sensors 33—see FIG. 3—are used to detect the currents 15 flowing in the main modules 5 and supply them to the control device 18. Finally, the control device 18 can also be supplied with a respective further nominal current value I2* per phase of the polyphase grid system 3 and/or of the nonlinear load 2 in addition to the nominal current values I1*. As an alternative or in addition to the nominal current values I2*, the control device 18 can be supplied with a respective nominal voltage value per phase.

On the basis of the values U, I4, I5, I1*, I2* supplied to it, the control device 18 then ascertains the actuating signals C* for the individual semiconductor switches 15 of the submodules 11.

In conjunction with FIG. 6 to 9, the ascertainment of the actuating signals C* is explained in more detail below.

Figure 6:
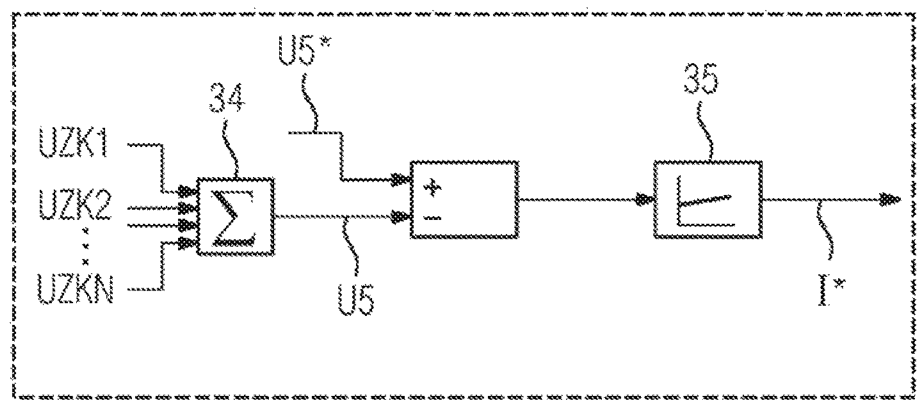
FIG. 6 shows a first part for an ascertainment method for a nominal current value of a main module.

In accordance with FIG. 6, an adder 34 is supplied—with reference to one of the main modules 5—for the voltages UZKi of the storage capacitors 17 of the submodules 11 of the relevant main module 5. The index i runs through the values from 1 to N, N being the number of submodules 11 of the respective main module 5. For this purpose, the voltages UZKi are detected by means of appropriate voltage sensors.

The adder 34 delivers the voltage U5 for the relevant main module 5 as an output signal. The voltage U5 is supplied to a voltage regulator 35, to which a nominal voltage value U5* for the relevant main module 5 is also supplied. The voltage regulator 35 may be in a form as required, particularly in the form of controller having an integral component. An example of such a controller is a PI controller, that is to say a proportional-integral controller. The voltage regulator 35 outputs a nominal current value I* as a manipulated variable.

The nominal current value I* output by the voltage regulator 35 is initially normalized. For this purpose, in accordance with FIG. 7, the instantaneous voltage U of the polyphase grid system 3, detected at a particular instant t, is normalized to the value 1 in a normalize 36. By way of example, a normalized value U' in accordance with the relationship $$U'(t) = \frac{U(t)}{\sqrt{U^2(t) + U^2(t - 1/4f)}}$$

can be ascertained for this purpose. The value U' ascertained by the normalizer 36 is multiplied in a multiplier 37 by the nominal current value I* output by the voltage regulator 35. The output signal from the multiplier 37 has a defined phase relationship in relation to the voltage U of the polyphase grid system 3. In particular, there may be a phase offset of 0° (electrically) in relation to that phase of the polyphase grid system 3 to which the relevant main module 5 is connected.

Figure 7:
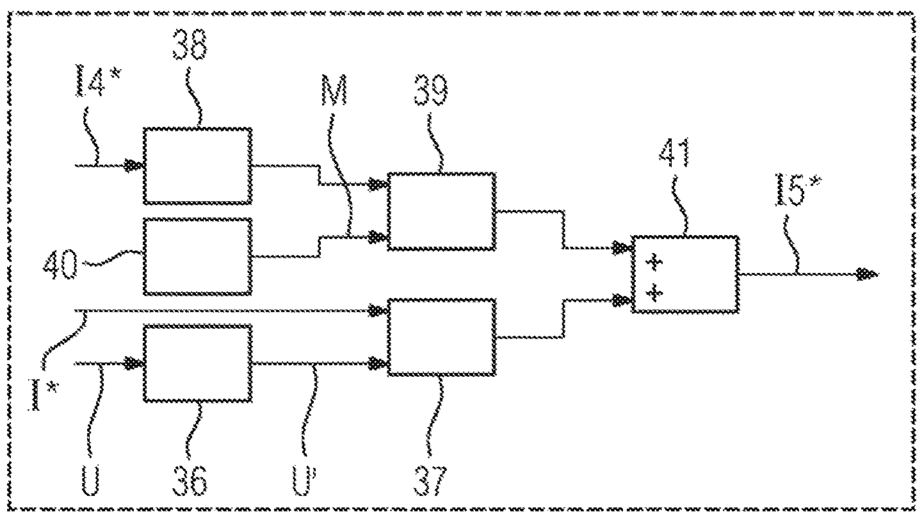
FIG. 7 shows a second part for the ascertainment method for a nominal current value of a main module.

In accordance with FIG. 7, a nominal current I4* to be output by the respective converter unit 4 is furthermore taken, in a nominal value ascertainer 38, as a basis for ascertaining a share for the relevant main module 5 of the respective converter unit 4. By way of example, the nominal current I4* may be determined by the nominal current value I1* for the relevant phase of the nonlinear load 2. If need be, determination of the nominal current I4* can additionally take into consideration the nominal current value I2*. In the simplest case, the nominal current I4* is evenly split over the main modules 5 of the respective converter unit 4. However, a different split is likewise possible. The split of the nominal current I4* over the main modules 5 of the respective converter unit 4 stipulates to what extent which phase of the polyphase grid system 3 is loaded by the respective converter unit 4. In principle, an arbitrary specification of the distribution is possible. In accordance with this specification, the load currents I4 supplied to the nonlinear load 2 are distributed to the phases of the polyphase grid system 3.

The output signal from the nominal value ascertainer 38 is supplied to a modulator 39. The modulator 39 is additionally supplied with a modulation signal M by a signal generator 40. The modulator 39 modulates the output signal from the nominal value ascertainer 38 with the modulation signal M. The output signal from the modulator 39 is added in an adder 41 to the output signal from the multiplier 37 to produce a resultant nominal current I5*. This value is the nominal value I5* for the current regulation of the relevant main module 5.

The modulation signal M may be determined as per requirements. In the simplest case, it is a sine signal. In this case, load currents I4 applied to the output connections 9 of the converter units 4 are sinusoidal. Alternatively, it is possible for the modulation signal M to be non sinusoidal. In this case, load currents I4 applied to the output connections 9 of the converter units 4 are non sinusoidal. The signal shape can be determined and set particularly on the basis of an operating state of the nonlinear load 2 (that is to say of the arc furnace 25).

Additionally, the modulation signal M has—regardless of its signal shape—preferably a fundamental frequency that is higher than the operating frequency f of the polyphase grid system 3. It is further possible for the fundamental frequency of the modulation signal M to be determined and set on the basis of an operating state of the nonlinear load 2 (that is to say of the arc furnace 25).

From the explanations above, it can additionally be seen that the load currents I4 of the converter units 4 can be determined individually. It is therefore possible for the load currents I4 to have equal RMS values. Similarly, however, it is possible for the load currents 4 to have different RMS values.

Figure 8:
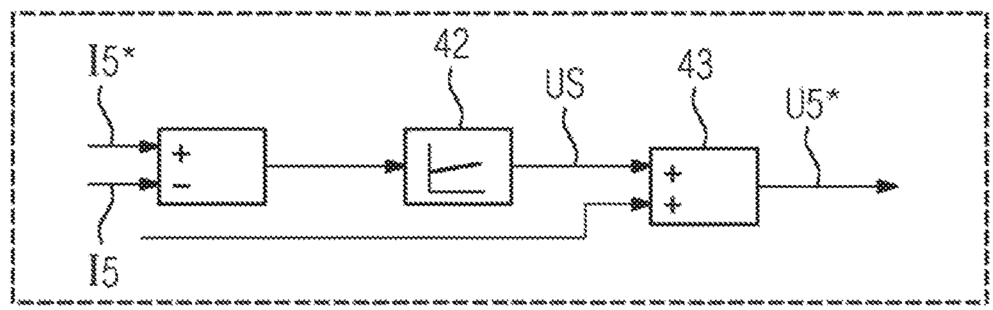
FIG. 8 shows an ascertainment method for a nominal voltage value of a main module.

The resultant nominal current I5*, as ascertained as part of the approach from FIG. 7 for the respective main module 5 is supplied, in accordance with FIG. 8, to a current regulator 42. The current regulator 42 is additionally supplied with the detected actual current I5 of the respective main module 5. On the basis of the variables I5*, I5 supplied to it, the current regulator 42 ascertains a voltage control signal US for the relevant main module 5. The current regulator 42 may be particularly in the form of a controller having an integral component, for example in the form of a PI controller.

The voltage control signal US of the current regulator 42 is supplied, in accordance with FIG. 8, to an adder 43 in which the instantaneous value U(t) of the voltage applied to the respective phase is added to the voltage control signal US. This addition is performed for the purposes of compensating for interference variables. The output signal from the adder 43 is the required voltage U5* that needs to be dropped in its entirety across the submodules 11 of the relevant main module 5.

Figure 9:
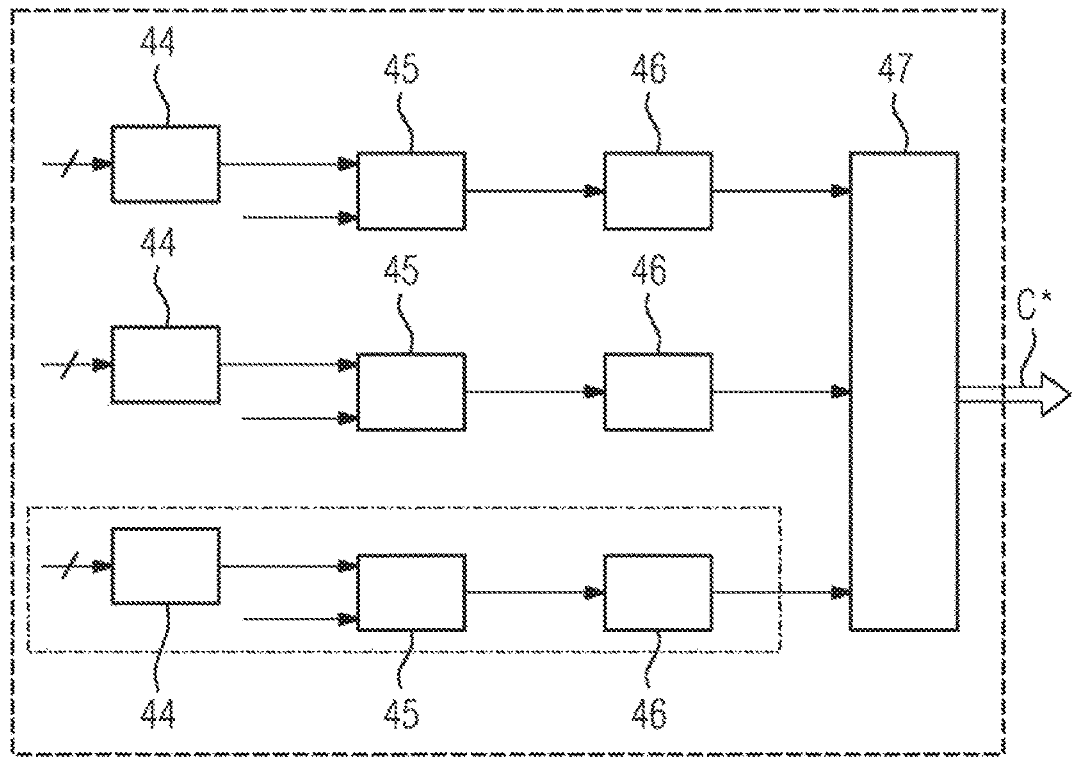
FIG. 9 shows an ascertainment method for the switching states of semiconductor switches of submodules.

FIG. 9 shows the ascertainment of the actuating signals C* for the semiconductor switches 15 of a complete converter unit 4. The blocks denoted by 44, 45 and 46 in FIG. 9 correspond, for each of the main modules 5 of the relevant converter unit 4, to the approaches explained above in conjunction with FIGS. 6 to 8. In accordance with FIG. 9, the ascertainment for the main modules 5 of the respective converter unit 4 is effected in parallel and independently of one another. The ascertained voltages U5* are supplied to an ascertainment device 47 that generates the actuating signals C* for the individual semiconductor switches 15 therefrom. This generation is known as such and, as such, is not further subject matter of the present invention.

From the explanations above, it can be seen that the currents I5 that are drawn from the polyphase grid system 3 by the main modules 5 and are supplied to the nonlinear load 2 can be determined independently of one another. In particular, they can be determined such that the load currents I4 supplied to the nonlinear load 2 are distributed to the phases of the polyphase grid system 3 as per specification. As a result, it is particularly possible for the grid system currents drawn from the polyphase grid system 3 to be sinusoidal and/or for the grid system currents drawn from the polyphase grid system 3 to have a predetermined phase offset relative to phase voltages U applied in the polyphase grid system 3, even though the nonlinear load 2 fluctuates. The phase offset may even be settable. This may make particular sense when the polyphase grid system 3 is intended to be provided with the "reactive power" functionality in a specific manner. It is even possible—see FIG. 1—to use an appropriate detection device 48 to detect a state Z of the polyphase grid system 3 and to take the detected state Z as a basis for ascertaining what phase offset the grid system currents drawn from the polyphase grid system 3 have and/or with what resultant amplitudes the grid system currents drawn from the polyphase grid system 3 are intended to be distributed to the individual phases of the polyphase grid system 3. In this case, the control device 18 takes into consideration the state Z as part of the ascertainment of the nominal current value I5*. By way of example, the state Z can be provided as part of the splitting of the desired load current I4* by the nominal value ascertainer 38. In addition, it may also be possible for it to be taken into consideration as part of the generation of the modulation signal M by the signal generator 40.

The present invention has many advantages. In particular, almost disturbance-free drawing of the electric power required for supply to the nonlinear load 2 from the polyphase grid system 3 is possible in a simple and reliable manner.

In summary, the present invention therefore relates to the following substantive matter:

A nonlinear load 2 is supplied with electric power via a power supply device 1. The nonlinear load 2 is in the form of an arc furnace 25 having an upstream furnace transformer 26. The power supply device 1 has a plurality of converter units 4. The converter units 4 each have multiple main modules 5. The main modules 5 each have an input connection 6 that is connected to a respective phase of a polyphase grid system 3. The converter units 4 each have a common star point 7 that is connected firstly to a respective output 8 of the main modules 5 of the respective converter unit 4 and secondly by an output connection 9 of the respective converter unit 4 to the primary side 27 of the furnace transformer 26. The main modules 5 each have a series circuit comprising a coupling inductance 10 and multiple submodules 11. The submodules 11 each have a submodule input 12 and a submodule output 13 and, in between, a bridge circuit 14 having four self-commutated semiconductor switches 15 and a bridge path 16. A respective storage capacitor 17 is arranged in the bridge path 16. The semiconductor switches 15 of the submodule 11 are each switchable independently of the semiconductor switches 15 of the other submodules 11 of the same main module 5 and of the other main modules 5.

Although the invention has been illustrated and described in more detail by means of the preferred exemplary embodiment, the invention is not restricted by the disclosed examples, and other variations can be derived therefrom by a person stilled in the art without departing from the scope of protection of the invention.

The invention claimed is:

1. An assembly, comprising:

a nonlinear load being an arc furnace with an upstream furnace transformer;

a power supply device for supplying said nonlinear load with electric power, said power supply device having a plurality of converter units;

each of said converter units having a plurality of main modules and an output connection;

each of said main modules having an input connection connected to a respective phase of a polyphase grid system operated at an operating frequency, and each of said main modules having an output;

each of said converter units having a common star point connected to a respective said output of said main modules and via said output connection of the respective converter unit to a primary side of said furnace transformer;

each of said main modules having a series circuit formed of a coupling inductance and a plurality of submodules;

each of said submodules having a submodule input and a submodule output and a bridge circuit connected between said submodule input and said submodule output, said bridge circuit having four self-commutated semiconductor switches and a bridge path with a respective storage capacitor; and wherein said semiconductor switches of said submodules are each switchable independently of said semiconductor switches of respective other submodules of the same said main module and of other said main module; and an electrode control connected to receive detected voltages applied to a secondary side of said furnace transformer and currents flowing on the secondary side of said furnace transformer;

wherein the voltages and currents detected on the secondary side of said furnace transformer are taken as a basis for using electrode control to perform position control for electrodes of said arc furnace; and wherein said electrode control is configured to ascertain nominal current values and/or nominal voltage values for said converter units.

2. The assembly according to claim 1, wherein a number of said converter units is at least three and/or a number of said main modules per converter unit is at least three.

3. The assembly according to claim 1, wherein said furnace transformer has no step switch.

4. The assembly according to claim 1, wherein said converter units have:

neither an inductor nor a capacitor;

either an inductor or a capacitor; or a series circuit of an inductor and a capacitor;

connected between their respective said star point and their respective said output connection.

5. The assembly according to claim 1, which comprises:

a first switching device for operational connection and isolation of said load from said converter units is connected between said output connections of said converter units and said load;

a second switching device for unscheduled isolation of said load from said converter units connected between said load and said converter units;

said second switching device having supplementary inputs connected to at least some phases of the polyphase grid system; and wherein said load, upon being isolated from said converter units during an unscheduled isolation, is connectable to the at least some phases via said second switching device and said supplementary inputs thereof.

6. The assembly according to claim 1, which comprises a control device configured to actuate said semiconductor switches of said submodules such that load currents applied to said output connections of said converter units are sinusoidal or nonsinusoidal.

7. The assembly according to claim 1, which comprises a control device configured to actuate said semiconductor switches of said submodules such that load currents applied to said output connections of said converter units have different RMS values.

8. The assembly according to claim 1, which comprises a control device configured to actuate said semiconductor switches of said submodules such that load currents supplied to said nonlinear load are distributed to the phases of the polyphase grid system as per specification.

9. The assembly according to claim 8, wherein the specification is as follows:

grid system currents drawn from the polyphase grid system are sinusoidal; and/or the grid system currents drawn from the polyphase grid system have a predetermined phase offset relative to phase voltages applied in the polyphase grid system.

10. The assembly according to claim 8, wherein the specification is influenced by a state of the polyphase grid system.

11. An assembly, comprising:

a nonlinear load being an arc furnace with an upstream furnace transformer;

a power supply device for supplying said nonlinear load with electric power, said power supply device having a plurality of converter units;

each of said converter units having a plurality of main modules and an output connection;

each of said main modules having an input connection connected to a respective phase of a polyphase grid system operated at an operating frequency, and each of said main modules having an output;

each of said converter units having a common star point connected to a respective said output of said main modules and via said output connection of the respective converter unit to a primary side of said furnace transformer;

each of said main modules having a series circuit formed of a coupling inductance and a plurality of submodules;

each of said submodules having a submodule input and a submodule output and a bridge circuit connected between said submodule input and said submodule output, said bridge circuit having four self-commutated semiconductor switches and a bridge path with a respective storage capacitor; and wherein said semiconductor switches of said submodules are each switchable independently of said semiconductor switches of respective other submodules of the same said main module and of other said main modules;

a first switching device for operational connection and isolation of said load from said converter units connecting between said output connections of said converter units and said load;

a second switching device for unscheduled isolation of said load from said converter units connecting between said load and said converter units;

said second switching device having supplementary inputs connected to at least some phases of the polyphase grid system; and wherein said load, upon being isolated from said converter units during an unscheduled isolation, is connectable to the at least some phases via said second switching device and said supplementary inputs thereof.

12. The assembly according to claim 11, which comprises an electrode control connected to receive detected voltages applied to a secondary side of said furnace transformer and currents flowing on the secondary side of said furnace transformer, wherein the voltages and currents detected on the secondary side of said furnace transformer are taken as a basis for using electrode control to perform position control for electrodes of said arc furnace and wherein said electrode control is configured to ascertain nominal current values and/or nominal voltage values for said converter units.

* * * * *